M. GREER.
FISH HOOK.
APPLICATION FILED FEB. 28, 1907.

906,792.

Patented Dec. 15, 1908.

WITNESSES
Jos. F. Collins.
H. H. Simms

INVENTOR
Moses Greer
by Knight Bros
Attorneys.

THE NORRIS PETERS CO., WASHINGTON, D. C.

UNITED STATES PATENT OFFICE.

MOSES GREER, OF ATLANTA, GEORGIA.

FISH-HOOK.

No. 906,792.  Specification of Letters Patent.  Patented Dec. 15, 1908.

Application filed February 28, 1907. Serial No. 359,914.

*To all whom it may concern:*

Be it known that I, MOSES GREER, a citizen of the United States, residing in the city of Atlanta, county of Fulton, and State of Georgia, have invented certain new and useful Improvements in Fish-Hooks, of which the following is a specification.

This invention relates to fish hooks.

In that type of fish hooks, which employs a bait hook pivotally connected to a striker hook so as to cause the operation of the latter when the bait hook is jerked, heretofore a great objection has been that the bait hook had nothing to limit its movement and thus has been able to swing in a complete circle. As a consequence, it has assumed positions which make it impossible to operate the hook.

An object of my invention is to provide means that will limit the swinging movement of the hook to only that movement which is necessary to operate the hook.

Other and further objects will appear in the following description and will be more particularly pointed out in the appended claims.

Figure 1:
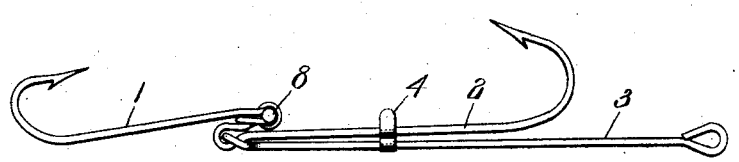
Figure 2:
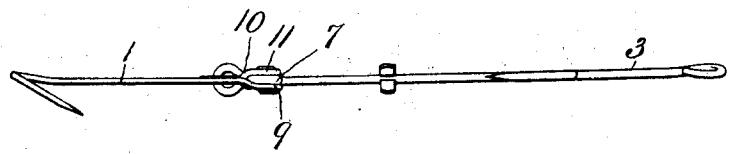
Figure 3:
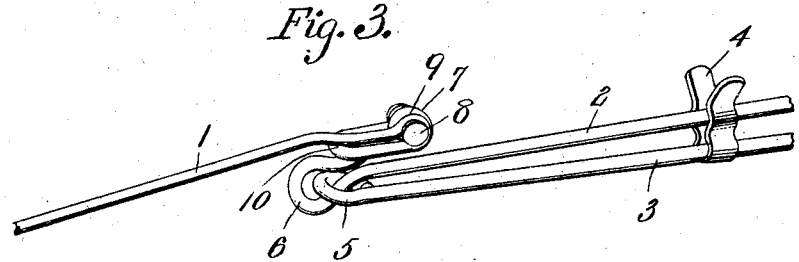

In the drawings, Figure 1 is a side view of my hook. Fig. 2 is a front view, and Fig. 3 is an enlarged perspective view of the point between the members of the hook.

Referring more particularly to the drawings, 1 indicates the bait hook, 2 the striker hook, 3 the supporting bar and 4 the yielding clasp carried by the supporting bar.

The supporting bar 3 is formed at one end with an eye 5 with which an eye 6 on an end of the striker hook 2 interlocks. The striker hook 2 is also provided with an eye 7 a short distance from the eye 6, the eye 7 being formed from the wire which also forms the eye 6 and the striker hook. Through the eye 7 passes a pintle 8 upon which the bait hook 1 is journaled, the bait hook being formed so as to straddle the eye 7 and lie upon opposite sides of the latter, thus positioning the bait hook so that it forms a stop to limit the swinging of the said bait hook.

A preferred manner of forming the bait hook so as to straddle the eye 7 and act as a hook, is to bend the wire of which the hook is formed, into an eye 9, then into a loop 10 extending parallel to the shank of the hook, and finally into an eye 11 parallel to the eye 9, the eyes 9 and 11 surrounding the pintle 8. It will be apparent that the loop or stop 10 will limit the swinging of the bait hook to 180° and that the bait hook cannot pass the striker hook at either end of the former's movement.

Having thus described my invention, what I claim and desire to secure by Letters Patent is:

1. In a fish hook of the character described, the combination with a pintle, of a bait hook pivoted thereto and having one end thereof bent to form parallel eyes and a loop between said eyes, whereby the movement of said bait hook is confined to a given plane.

2. The combination with a supporting bar, of a striker hook pivoted thereto, a bait hook pivoted to the striker hook, and means carried by one of the hooks to prevent movement of the bait hook past the striker hook.

3. The combination with a supporting bar, of a striker hook pivoted thereto, a bait hook pivoted to the striker hook, and means forming an integral part of said bait hook, whereby the movement of the bait hook past the striker hook is prevented.

4. The combination with a supporting bar, of a striker hook pivoted thereto, a bait hook pivoted to the striker hook, and means formed integral with said bait hook for limiting its swinging movement to a given plane.

5. The combination with a supporting bar of a striker hook pivoted to the supporting bar, and a bait hook pivoted to the striking hook and carrying a stop to limit the swinging movement of the bait hook.

6. The combination with a supporting bar, of a striker bar pivoted to the supporting bar, and having an eye near one end, a pintle mounted in the eye, and a bait hook having a pair of parallel eyes lying upon opposite sides of the eye of the striker hook, and a stop loop connecting the eye and extending parallel to the shank of the bait hook.

The foregoing specification signed at Atlanta Ga. this 5th day of January, 1907.

MOSES GREER.

In presence of two witnesses—
  DAVID N. KEEFER,
  ED. GRESHAM.